W. R. HAGER.
METHOD OF AND APPARATUS FOR SUPPLYING HEATED LIQUIDS.
APPLICATION FILED FEB. 21, 1917.
1,345,924.  Patented July 6, 1920.
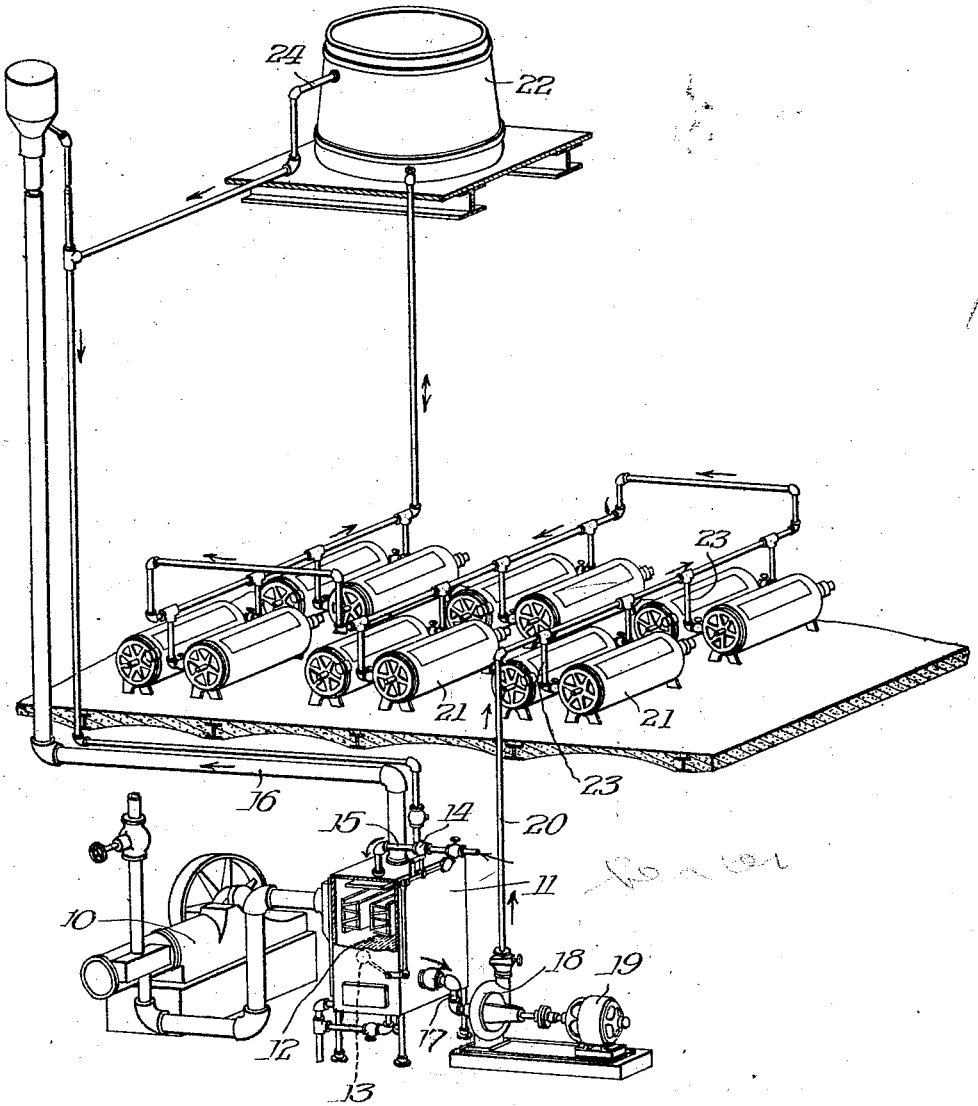

UNITED STATES PATENT OFFICE.

WILLIAM R. HAGER, OF CHICAGO, ILLINOIS, ASSIGNOR TO TROY LAUNDRY MACHINERY CO., LTD., OF CHICAGO, ILLINOIS, A CORPORATION OF ILLINOIS.

METHOD OF AND APPARATUS FOR SUPPLYING HEATED LIQUIDS.

1,345,924.  Specification of Letters Patent.  Patented July 6, 1920.

Application filed February 21, 1917. Serial No. 150,288.

*To all whom it may concern:*

Be it known that I, WILLIAM R. HAGER, a citizen of the United States, and resident of Chicago, in the county of Cook and State of Illinois, have invented certain new and useful Improvements in Methods of and Apparatus for Supplying Heated Liquids, of which the following is a specification.

My invention relates to a process and apparatus for furnishing adequate quantities of hot water as required in laundries, industrial plants, etc. As my invention is shown in its application to a laundry, I will hereafter refer to the same solely in that association. It may, however, be used in other establishments with equal facility and advantage.

It is essential in laundries that a large quantity of hot water be provided for use in the washers, a number of which are commonly associated in one room. The demand for water will vary; at certain times there will be no water required, while at others it may be necessary to simultaneously supply several machines. This necessitates maintaining a relatively large volume of water in reserve. Not only must the required quantity be maintained but provision must be made for supplying water at the proper temperature even after a period within which no water is required and during which period the heat of the water in the supply pipes would be radiated if allowed to remain quiet. It is therefore necessary to constantly move the water in the supply main.

In my preferred arrangement I provide means for heating the water and maintaining a body thereof in association with the heater, the heating means preferably consisting of an open heater in which exhaust steam is brought into direct contact with the water. A main connects the body of water in the heater to a body of water in an elevated storage tank, branches from the main being provided to divert the water to the washing machines. A pump maintains a constant flow of water toward the tank. A tank overflow and return pipe serves to return excess water to the heater. A predetermined height of water is maintained in the heater by means of a float-controlled cold water inlet. Preferably the water supplied to the main and which is employed for washing purposes is withdrawn from a point near the bottom of the heater in order to be able to withdraw all or substantially all of the water therefrom if required.

The method and apparatus preferably employed in practising the same will be better understood by reference to the accompanying drawing in which the figure is a perspective view, somewhat diagrammatic in form, showing an installation made in accordance with my invention.

In the drawing it will be seen that a steam engine 10, which may be utilized for power purposes, delivers exhaust steam into an open heater 11, of any approved form. Within this heater a body of water 12, is maintained, a predetermined height of water being assured by the employment of a float 13, which controls a valve 14, in a cold water inlet pipe 15. Uncondensed steam is permitted to escape through the exhaust pipe 16, to the atmosphere.

Hot water is withdrawn from the body of water 12, through an outlet pipe 17, by means of a pump 18, which may be operated by a constant speed motor 19. The water is caused to pass through a conduit or main 20, which passes in proximity to the washing machines 21, and terminates in the bottom of an elevated storage tank 22. Branch pipes 23, are employed for diverting water into the washing machines. During a period when little or no water is withdrawn from the main for use in the washing machines, the tank will be filled and water will overflow through the pipe 24, and be returned to the heater where it is again brought in contact with the steam and reheated.

In operation a quantity of water is heated by the exhaust steam and the pump started in operation. Water is withdrawn from the heater and supplied to the washing machines, the excess being delivered into the storage tank. The level of water in the heater is maintained by supplying cold water as described. No water is returned to the heater until the storage tank is full. The particular advantage arising out of this arrangement is in that water may be simultaneously withdrawn for use in two or more machines for the reason that pressure is available from both ends of the supply main. If it were supplied from one end only, the withdrawal by one machine would rob the conduit and prevent other machines from obtaining a supply at that time.

In laundries employing a plurality of washers it frequently happens that several thereof require a supply of water at the same time. It is impracticable to provide a pump of sufficient capacity to simultaneously supply all thereof, and the desired result is attained by providing a storage tank by means of which the quantity furnished by the pump may be augmented. Thus there need be no delay in filling the washers even though a pump of small capacity be employed, and a relatively small volume of water be constantly circulated.

A further advantage is in that the water is constantly being circulated and there is therefore no opportunity for undue cooling by stagnation in the pipes.

Preferably the system is installed in connection with an engine having a substantially constant speed and load and which will, therefore, deliver a substantially constant supply of exhaust steam. The amount of available heat in said steam having been determined, the volume of water which may be heated and delivered for use may also be determined. Therefore, such a number of washers will be connected thereto as will under normal conditions require an equal amount of water at the proper temperature.

The exact form and arrangement is not essential and I do not wish to be limited except as indicated in the appended claims.

I claim:

1. Apparatus for heating and circulating heated water, comprising in combination, a heater adapted to contain a body of heated water, an elevated storage tank adapted to contain another body of water, a main connecting the two bodies, a branch from said main for withdrawing water from either of said bodies, a tank overflow pipe communicating with said heater, and means for causing circulation of said water, substantially as described.

2. Apparatus of the character described, comprising in combination, a container for heating and storing a body of water, an elevated container for storing a second body of water, a conduit connecting said containers, branches from said conduit for withdrawing water from either or both said containers, a pump for constantly moving water toward said elevated container, and a tank overflow pipe for returning water to said heater, substantially as described.

3. In combination, a plurality of means adapted to simultaneously require a supply of heated water, a conduit connected to said means, a hot water container at each end of said conduit, both of which containers are adapted to supply water to said means, a return pipe between said containers, and means for effecting constant enforced circulation of the water, substantially as described.

4. The method of heating and maintaining a supply of heated water for washing machines and the like, which consists in maintaining two separate bodies of heated water, one of said bodies being elevated above the washing machines, causing the water to flow from either of said bodies to said washing machines, diverting the water in its passage to such machines as desired, permitting the excess of water in said elevated tank to return to the other body, maintaining a fixed water level in said elevated tank, and heating the water.

5. Apparatus for heating and circulating heated water for use in washing machines and the like, in combination, a heater adapted to contain a body of heated water, an elevated storage tank adapted to contain another body of water, a single main connecting the two bodies, a plurality of washing machines, branches from said main to said machines, connections in said main to permit withdrawal of water from either body for use in the machines, a tank overflow pipe communicating with said heater, and means for circulating the water.

6. In an apparatus of the character described, in combination with means for utilizing a heated fluid, means for heating said fluid, an elevated storage tank, means for delivering said heated fluid to a place of use and to said tank, means for returning an excess of liquid from the tank to the heater, and means for supplying the place of use with heated liquid from either the heater or the tank.

Signed at Chicago, Illinois, this 14th day of February, 1917.

WILLIAM R. HAGER.

Witnesses:
MILTON T. MILLER,
C. F. MURRAY.